United States Patent
Lee et al.

(10) Patent No.: US 11,634,028 B2
(45) Date of Patent: Apr. 25, 2023

(54) IMAGE PROCESSING METHOD OF GENERATING AN IMAGE BASED ON A USER VIEWPOINT AND IMAGE PROCESSING DEVICE

(71) Applicant: SAMSUNG ELECTRONICS CO., LTD., Suwon-si (KR)

(72) Inventors: Jinho Lee, Suwon-si (KR); Dong Kyung Nam, Yongin-si (KR); Juyong Park, Seongnam-si (KR); Yang Ho Cho, Seongnam-si (KR); Kyuhwan Choi, Yongin-si (KR); Yoonsun Choi, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 259 days.

(21) Appl. No.: 15/840,382

(22) Filed: Dec. 13, 2017

(65) Prior Publication Data

US 2019/0034731 A1    Jan. 31, 2019

(30) Foreign Application Priority Data

Jul. 28, 2017    (KR) .................. 10-2017-0095912

(51) Int. Cl.
*B60K 35/00* (2006.01)
*G06T 5/50* (2006.01)
(Continued)

(52) U.S. Cl.
CPC .............. *B60K 35/00* (2013.01); *B60K 37/06* (2013.01); *G02B 27/0101* (2013.01); *G02B 27/017* (2013.01); *G02B 30/26* (2020.01); *G06T 5/50* (2013.01); *G06V 20/20* (2022.01); *B60K 2370/149* (2019.05); *B60K 2370/1529* (2019.05); *B60K 2370/1531* (2019.05); *B60K 2370/177* (2019.05); *B60K 2370/178* (2019.05); *B60K 2370/179* (2019.05);
(Continued)

(58) Field of Classification Search
None
See application file for complete search history.

(56) References Cited

U.S. PATENT DOCUMENTS 9,393,870 B2    7/2016  Ng-Thow-Hing et al.
2009/0009594 A1 1/2009  Kawai
(Continued)

FOREIGN PATENT DOCUMENTS

CN    104950460 A    9/2015
CN    105116546 A    12/2015
(Continued)

OTHER PUBLICATIONS

Communication dated Jan. 22, 2019, issued by the European Patent Office in counterpart European Application No. 18181404.7.
(Continued)

*Primary Examiner* — Jeffrey J Chow
(74) *Attorney, Agent, or Firm* — Sughrue Mion, PLLC (57) ABSTRACT

Provided are an image processing method and an image processing device. The image processing method includes generating an image based on viewpoint information of a user; rendering the image based on information about what is in front of the user; and outputting the rendered image using an optical element.

15 Claims, 10 Drawing Sheets

(51) Int. Cl.
  *G02B 27/01* (2006.01)
  *B60K 37/06* (2006.01)
  *G02B 30/26* (2020.01)
  *G06V 20/20* (2022.01)
  *B60W 50/14* (2020.01)

(52) U.S. Cl.
  CPC .... *B60K 2370/191* (2019.05); *B60K 2370/21* (2019.05); *B60K 2370/334* (2019.05); *B60K 2370/736* (2019.05); *B60K 2370/785* (2019.05); *B60W 50/14* (2013.01); *G02B 2027/014* (2013.01); *G02B 2027/0134* (2013.01); *G02B 2027/0181* (2013.01); *G02B 2027/0187* (2013.01)

(56) References Cited

U.S. PATENT DOCUMENTS

| | | | |
|---|---|---|---|
| 2014/0232746 | A1 | 8/2014 | Ro et al. |
| 2015/0226965 | A1 | 8/2015 | Kim et al. |
| 2016/0073098 | A1 | 3/2016 | Villalobos Martinez et al. |
| 2016/0082840 | A1 | 3/2016 | Yoshida et al. |
| 2016/0173867 | A1* | 6/2016 | Ichihashi ............. H04N 13/356 348/54 |
| 2016/0209647 | A1 | 7/2016 | Fursich |
| 2017/0155867 | A1* | 6/2017 | Yokota ................. B60K 35/00 |
| 2018/0144542 | A1 | 5/2018 | Park et al. |
| 2019/0025580 | A1* | 1/2019 | Nagano ................. B60K 35/00 |
| 2019/0310474 | A1* | 10/2019 | Kobayashi ......... G02B 27/0149 |

FOREIGN PATENT DOCUMENTS

| | | |
|---|---|---|
| CN | 105163972 A | 12/2015 |
| CN | 106218409 A | 12/2016 |
| DE | 10 2013 218 085 A1 | 3/2015 |
| EP | 3 046 325 A1 | 7/2016 |
| JP | 2005-222026 A | 8/2005 |
| JP | 2009-229552 A | 10/2009 |
| JP | 2011-73496 A | 4/2011 |
| JP | 2011-133508 A | 7/2011 |
| JP | 2014-010418 A | 1/2014 |
| JP | 2014-150304 A | 8/2014 |
| JP | 2016-506572 A | 3/2016 |
| JP | 6105531 B2 | 3/2017 |
| KR | 10-2014-0080789 A | 7/2014 |
| KR | 10-1714185 B1 | 3/2017 |
| WO | 2012/176445 A1 | 12/2012 |
| WO | 2014/109398 A1 | 7/2014 |
| WO | 2014/136144 A1 | 9/2014 |
| WO | 2015/145935 A1 | 10/2015 |

OTHER PUBLICATIONS

Communication dated Mar. 12, 2021, from The China National Intellectual Property Administration in Application No. 201810777341.8.

Communication dated Apr. 27, 2021 by the Japanese Patent Office in counterpart Japanese Patent Application No. 2018-133933.

* cited by examiner

IMAGE PROCESSING METHOD OF GENERATING AN IMAGE BASED ON A USER VIEWPOINT AND IMAGE PROCESSING DEVICE

CROSS-REFERENCE TO RELATED APPLICATION

This application claims priority from Korean Patent Application No. 10-2017-0095912, filed on Jul. 28, 2017 in the Korean Intellectual Property Office, the disclosure of which is incorporated herein by reference in its entirety.

BACKGROUND

1. Field

Methods and apparatuses consistent with exemplary embodiments relate to an image processing method and an image processing device.

2. Description of the Related Art

A driver driving a transportation device, for example, an automobile, a motorcycle, a smart mobility vehicle, a boat or ship, or an airplane, may acquire information associated with an operation of the transportation device through navigation. A navigation device may be embedded in a control panel portion of a center console of the vehicle or may be attached to a front windshield.

A driver must pay attention to obstacles present at the front, rear, and sides, of the vehicle while driving. However, if the navigation device is outside of a typical viewing angle or outside of the line of sight of the driver, the driver may either ignore the navigation device or may engage in unsafe driving. In particular, the risk of accidents may increase for inexperienced drivers.

A driver may use a head-up display (HUD) device that assists in driving. The HUD device may project information, for example, instrument panel information and navigation information, associated with an operation of the vehicle onto the windshield. That is, the driver may view information associated with the operation of the vehicle without changing his gaze or line of sight during driving and thus, may safely drive the vehicle.

In addition to displaying display panel information, for example, vehicle speed, oil level, and revolutions per minute (RPMs); and navigation information, certain device may also display lane information, information about a dangerous situation ahead, for example, construction, a traffic accident, or a warning about an object, etc., using the HUD device in an augmented reality (AR) form.

SUMMARY

One or more exemplary embodiments may address at least the above problems and/or disadvantages and other disadvantages not described above. Also, the exemplary embodiments are not required to overcome the disadvantages described above, and an exemplary embodiment may not overcome any of the problems described above.

According to an aspect of an exemplary embodiment, there is provided an image processing method including generating an image based on viewpoint information of a user; rendering the image based on information about what is in front of the user, including at least one of surroundings and an object present in front of the user; and outputting the rendered image using an optical element.

The rendering of the image may include acquiring one of a shape, a position, and a depth of an object present in front of the user using a sensor.

The generating of the image may include acquiring the viewpoint information using an image camera or an infrared camera.

The acquiring may include acquiring the viewpoint information by directly detecting an eye of the user using the image camera or the infrared camera or by detecting the eye of the user reflected on a windshield of a vehicle.

The generating of the image may include determining a position of an eye of the user based on the viewpoint information; and allocating an image to a plurality of sub-pixels corresponding to the position of the eye.

The allocating of the image may include allocating an image to be input to a left eye of the user to a plurality of sub-pixels corresponding to a position of the left eye of the user; and allocating an image to be input to a right eye of the user to a plurality of sub-pixels corresponding to a position of the right eye of the user.

The generating of the image may include generating the image based on the viewpoint information and on an optical transform.

The optical element may be a lenticular lens or a parallax barrier.

The outputting of the rendered image may include enlarging the rendered image using a magnifying optical system.

The magnifying optical system may include one of an aspherical mirror and a plane mirror.

The rendering of the image may include rendering the image so that a depth of the image is greater than a virtual image distance.

According to an aspect of another exemplary embodiment, there is provided an image processing device including a controller configured to generate an image based on viewpoint information of a user, and to render the image based on information about what is in front of the user including at least one of surroundings and an object present in front of the user; and an optical element configured to output the rendered image.

The controller may be configured to acquire one of a shape, a position, and a depth of an object present in front of the user using a sensor.

The controller may be configured to acquire the viewpoint information using an image camera or an infrared camera.

The image camera or the infrared camera may be configured to acquire the viewpoint information based on an eye of the user directly detected or the eye of the user reflected on a windshield of a vehicle.

The controller may be configured to determine a position of an eye of the user based on the viewpoint information and to allocate an image to a plurality of sub-pixels corresponding to the position of the eye.

The controller may be configured to allocate an image to be input to a left eye of the user to a plurality of sub-pixels corresponding to a position of the left eye of the user, and to allocate an image to be input to a right eye of the user to a plurality of sub-pixels corresponding to a position of the right eye of the user.

The controller may be configured to generate the image based on the viewpoint information and on an optical transform.

The optical element may be a lenticular lens or a parallax barrier.

The image processing device may further include a magnifying optical system configured to enlarge the image output from the optical element.

The magnifying optical system may include one of an aspherical mirror and a plane mirror.

The controller may be configured to render the image so that a depth of the image is greater than a virtual image distance.

BRIEF DESCRIPTION OF THE DRAWINGS

The above and/or other exemplary aspects will be more apparent by describing certain exemplary embodiments with reference to the accompanying drawings, in which.

DETAILED DESCRIPTION

Reference will now be made in detail to exemplary embodiments which are illustrated in the accompanying drawings, wherein like reference numerals refer to the like elements throughout. Exemplary embodiments are described below in order to explain the present disclosure by referring to the figures.

The following structural or functional descriptions are exemplary to merely describe the exemplary embodiments, and the scope of the exemplary embodiments is not limited to the descriptions provided in the present specification. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Hereinafter, the exemplary embodiments are described with reference to the accompanying drawings. However, the scope of the exemplary embodiments are not limited thereto or restricted thereby. Here, like reference numerals illustrated in each drawing refer to like elements throughout.

Figure 1:
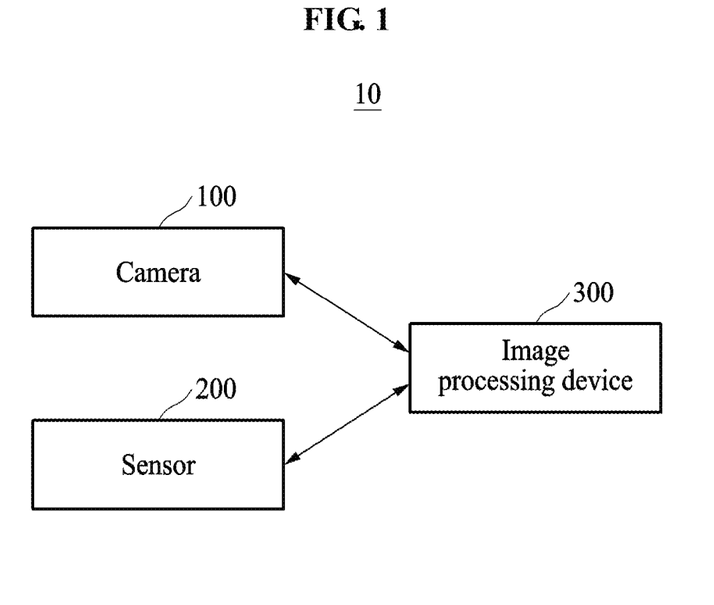
FIG. 1 is a diagram illustrating an image processing system according to an exemplary embodiment.

FIG. 1 is a diagram illustrating an image processing system according to an exemplary embodiment.

Referring to FIG. 1, an image processing system 10 includes a camera 100, a sensor 200, and an image processing device 300.

The image processing system 10 may provide information associated with an operation to a user. Herein, the user may be a driver that drives a transportation device. For example, the image processing system 10 may provide the user with instrument panel information, navigation information, lane information, information about a dangerous situation ahead, and the like. The instrument panel information may include a speed, an oil level, an RPM, etc., of the transportation device. Information about the dangerous situation ahead may include information about construction or a traffic accident, or a warning for an object, such as an animal, a human being, a bicycle, a vehicle, or the like.

The image processing system 10 may output information associated with the operation in an AR form. The image processing system 10 may output an image in front of a driver, that is, a user using a windshield. For example, the image processing system 10 may output an optical image or a virtual image.

The image processing system 10 outputting the optical image or the virtual image may include adjusting a position and a depth of the optical image or the virtual image. That is, the image processing system 10 may adjust a distance and a depth at which the image is represented. An operation of the image processing system 10 adjusting the distance and depth, by the image processing system 10 is described with reference to FIGS. 7A and 7B, and FIGS. 8 and 9. The user may perform safe driving by referring to the optical image or the virtual image reflected on the windshield.

The image processing system 10 may be configured in the transportation device. For example, the image processing system 10 may be configured in an automobile, a motorcycle or an auto bicycle, a smart mobility vehicle, a boat or ship, or an airplane. Hereinafter, a description is made based on an example in which the image processing system 10 is configured in a vehicle. However, this is merely exemplary.

The camera 100 may track viewpoint information of the user. The viewpoint information may include a position and/or a viewpoint of an eye of the user. For example, the camera 100 may acquire information about a position of a left eye and a position of a right eye of the user. Also, the camera 100 may acquire information about a direction in which the user is gazing. The camera 100 may acquire ray information corresponding to each of the left eye and the right eye.

The camera 100 may be provided in front of the user. The camera 100 may be provided at an upper portion or a lower portion of the windshield and may track a position and/or a viewpoint of an eye of the user in front of the user. Also, the camera 100 may be configured within the image processing device 300.

For example, when the camera 100 is provided at an upper portion of the windshield, the camera 100 may be configured within a rear view mirror. When the camera 100 is provided at a lower portion of the windshield, the camera 100 may be configured within a dashboard.

The camera 100 may face the user or face the windshield. When the camera 100 faces the windshield, the camera 100 may track a position and/or a viewpoint of an eye of the user as reflected on the windshield.

The camera 100 may track the position and/or the viewpoint of the user's eye in real time. For example, when the user, that is, the driver gazes ahead from a position in the driver's seat and then gazes ahead from a position of the passenger's seat, by tilting his body, the camera 100 may acquire information indicating that the position of the eye of the user has moved from the position of the driver seat to the position of the passenger seat. Also, when the user gazes toward the front and then gazes toward right, in order to turn right, the camera 100 may acquire information indicating that the viewpoint of the user has moved from the front to the right.

The camera 100 may be an image camera and/or an infrared camera. For example, if light, for example, the intensity of light is sufficient or it is during the daytime, the image camera may track a viewpoint of the user. If light, for example, the intensity of light, is insufficient or it is during the nighttime, the infrared camera may track the viewpoint of the user.

The camera 100 may include a clock to measure time. For example, the duration of a preset time may be determined to be a time during which light, for example, the intensity of light, is sufficient or during which it is considered to be the daytime, and the image camera may operate. If the preset time has elapsed, it may be determined to be a time during which light, for example, the intensity of light, is insufficient or during which it is considered to be the nighttime, and the infrared camera may operate.

Also, the camera 100 may include an optical sensor or a photodetector configured to measure, for example, the intensity of light. If the intensity of light measured at the optical sensor is greater than or equal to a reference value, the image camera may operate. If the intensity of light measured at the optical sensor is less than the reference value, the infrared camera may operate. The optical sensor may be configured as a separate sensor 200 instead of being included in the camera 100.

The camera 100 may output information about the tracked position and/or viewpoint of the user's eye to the image processing device 300.

The sensor 200 may acquire information about what is in front of the vehicle. For example, the sensor 200 may acquire information about the vehicle surroundings and/or an object present ahead of the vehicle. The sensor 200 may be a radar device, a light detection and ranging (LIDAR) apparatus, an ultrasound sensor, an infrared sensor, a thermal sensor, an optical sensor, a global positioning system (GPS) module, or the like.

Information about the vehicle surroundings may include, for example, road information, lane information, speed bump information, traffic light information, and speed camera information.

Information about the object may include, for example, shape information, position information, and depth information of the object.

The sensor 200 may output information about what is in front of the vehicle to the image processing device 300.

The image processing device 300 may acquire information about the tracked position and/or viewpoint of the user's eye from the camera 100 and may acquire information about what is in front of the vehicle from the sensor 200.

The image processing device 300 may generate an image based on information about the tracked position and/or viewpoint of the user's eye. The image processing device 300 may determine the position of the user's eye of the user based on information about the tracked position and/or viewpoint of the user's eye and may allocate the image to pixels corresponding to the position of the eye. That is, the image processing device 300 may include a display.

A single pixel may include a plurality of sub-pixels. The image processing device 300 may output the image by allocating, to sub-pixels, sub-pixel values corresponding to the image to be output.

For example, the image processing device 300 may allocate an image to be input to the user's left eye to a plurality of sub-pixels corresponding to a position of the user's left eye and may allocate an image to be input to the user's right eye to a plurality of sub-pixels corresponding to a position of the user's right eye.

The image processing device 300 may acquire information about what is in front of the vehicle from the sensor 200. The image processing device 300 may render the generated image based on information about what is in front of the vehicle. The image processing device 300 may output the rendered image to the user.

The image processing device 300 may be provided at a lower portion of the dashboard of the vehicle and may output a plurality of rays to the windshield. The user may view the plurality of rays reflected through the windshield. The image processing device 300 may be a HUD device.

The image processing device 300 may include a glasses-free (glassesless) three-dimensional (3D) display or an autostereoscopic 3D screen. For example, the image processing device 300 may uniformly output a plurality of rays associated with the rendered image. That is, the image processing device 300 may output the rendered image in an AR form. Accordingly, the user may view a 3D image without wearing 3D glasses, stereoscopic glasses, or smart glasses. The user may further safely drive the vehicle by referring to the 3D image that matches information associated with the operation.

Figure 2:
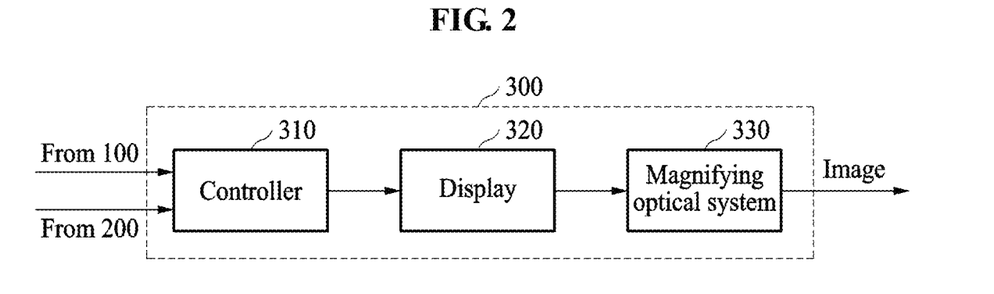
FIG. 2 is a diagram illustrating an example of an image processing device of FIG. 1 according to an exemplary embodiment.
Figure 3:
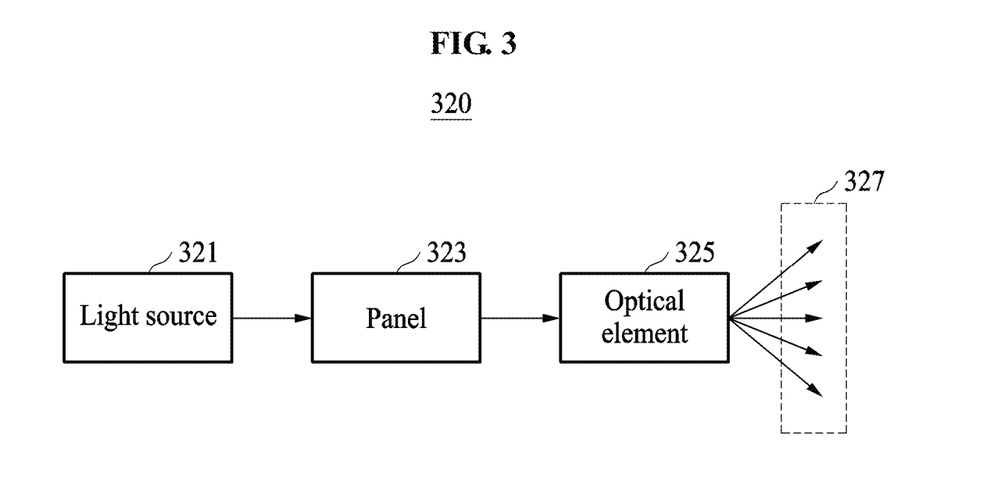
FIG. 3 is a diagram illustrating an example of a display of FIG. 2 according to an exemplary embodiment.

FIG. 2 is a diagram illustrating an example of an image processing device of FIG. 1 according to an exemplary embodiment; FIG. 3 is a diagram illustrating an example of a display of FIG. 2 according to an exemplary embodiment; and FIG. 4 illustrates an operation of an optical element of FIG. 3 according to an exemplary embodiment.

Figure 4:
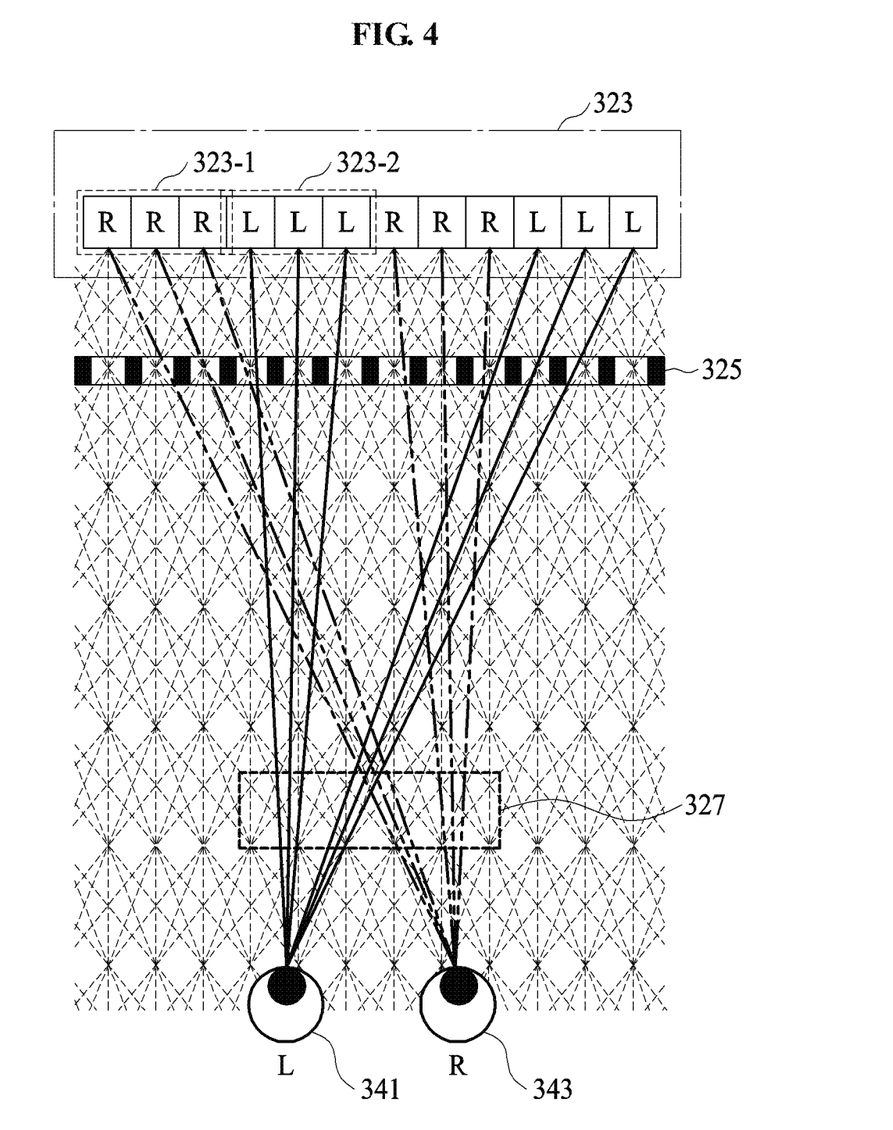
FIG. 4 illustrates an operation of an optical element of FIG. 3 according to an exemplary embodiment.

Referring to FIGS. 2 through 4, the image processing device 300 includes a controller 310, a display 320, and a magnifying optical system 330.

The controller 310 may acquire information about a tracked position and/or a viewpoint of an eye of a user from the camera 100, and may acquire information about what is in front of a vehicle from the sensor 200.

The controller 310 may perform a 3D image rendering operation based on information about the position and/or the viewpoint of the eye of the user acquired from the camera 100. The 3D image rendering operation may refer to performing a rendering operation on the image so that the user may view a 3D image. The controller 310 may perform a light field rendering operation on the left eye and the right eye of the user.

The controller 310 may allocate pixel values, corresponding to an image to be output, to a plurality of pixels of the display 320 based on information about the position and the viewpoint of the user. A single pixel may include a plurality of sub-pixels. For example, the controller 310 may allocate sub-pixel values corresponding to an image to be output to a plurality of sub-pixels.

In detail, the controller 310 may allocate a pixel value (sub-pixel values) corresponding to a first viewpoint to a first pixel (first sub-pixels) and may allocate a pixel value (sub-pixel values) corresponding to a second viewpoint to a second pixel (second sub-pixels). Here, the first viewpoint and the second viewpoint used to allocate a pixel value may be referred to as candidate viewpoints. The candidate viewpoints may include a left viewpoint and a right viewpoint for a single user or may include a predetermined number of viewpoints for a multi-view. For example, the first viewpoint may be a viewpoint for the right eye of the user and the second viewpoint may be a viewpoint for the left eye of the user.

The controller 310 may perform a 3D image rendering operation in real time. For example, in response to a change in a position or a viewpoint of the user, the controller 310 may acquire information about the changed position and/or viewpoint of the eye of the user from the camera 100 and may perform the 3D image rendering operation in real time based on the changed information. The user may view an image representing a sense of reality similar to an actual environment and the user's visual fatigue may be reduced. Also, the controller 310 may perform the 3D image rendering operation in real time, which may be advantageous in displaying a large screen, a high depth, and a continuous parallax.

The controller 310 may perform an optical transform or an optical inverse-transform on the tracked position and/or viewpoint of the eye of the user. To configure a precise 3D image, a plurality of rays output from the image processing device 300 may need to be accurately and uniformly incident onto the right eye and the left eye of the user. Thus, the controller 310 may perform the 3D image rendering operation through the optical transform or the optical inverse-transform. The optical transform or optical inverse-transform operation of the controller 310 is described with reference to FIG. 5.

Also, the controller 310 may perform an AR object rendering operation based on information about what is in front of the vehicle acquired from the sensor 200. The AR object rendering operation may indicate a rendering operation for configuring an environment similar to reality with respect to an object included in the image to be output.

For example, the controller 310 may generate an AR object of an image to be output based on information about the surroundings of the vehicle and an object present in front of the vehicle, and may perform a rendering operation on the AR object. The AR object may indicate AR content.

The controller 310 may apply depth information to an image to be output. For example, the controller 310 may adjust a depth of an AR object included in the image to be output. The controller 310 may adjust the depth of the AR object within the range of 0 to 100 m.

The controller 310 may perform the AR object rendering operation using navigation, map information, a geographic information system (GIS), and the like. For example, the controller 310 may output an accurate position of the user, operation information, and the like on a map using navigation, map information, a GIS, and the like.

The controller 310 may perform the AR object rendering operation based on information about the position and/or the viewpoint of the eye of the user. For example, the controller 310 may control a plurality of rays output from the display 320 to adaptively output an image corresponding to a change in a position or a viewpoint of the user. Accordingly, a sense of difference occurring due to a depth difference between an actual object and an AR object of an image may be reduced and the user may view an image representing a sense of reality similar to an actual environment and a visual fatigue of the user may be reduced.

The display 320 may be configured as a 3D display using a light field scheme. For example, the display 320 may be a light field display.

Referring to FIG. 3, the display 320 includes a light source 321, a panel 323, and an optical element 325. The display 320 may output a plurality of rays 327.

The light source 321 may be configured as a backlight unit at the rear of the display, or may be configured as a directional backlight unit that is an example of an optical layer. The directional backlight unit may provide a plurality of rays having a limited direction to the panel 323.

The light source 321 may include a white light emitting diode (LED), a red, green, and blue (RGB) LED, or an RGB laser. The light source 321 may output, that is emit, a plurality of rays used to generate an image.

The plurality of rays output from the light source 321 may pass through at least one of the panel 323 and the optical element 325.

The panel 323 may be configured as a liquid crystal display (LCD) panel including a plurality of pixels. The panel 323 may output an image based on pixel values, for example, sub-pixel values, allocated by the controller 310. That is, the plurality of rays output from the light source 321 may pass through the plurality of pixels (plurality of sub-pixels) of the panel 323 and an image corresponding to a pixel value (sub-pixel values) of each of the plurality of pixels may be viewed by the user.

For example, the panel 323 may provide a ray of a first viewpoint direction to a pixel to which a pixel value corresponding to a first viewpoint is allocated, and may provide a ray of a second viewpoint direction to a pixel to which a pixel value corresponding to a second viewpoint is allocated. The user may view an image corresponding to the first viewpoint at the first viewpoint and may view an image corresponding to the second viewpoint at the second viewpoint. The user may observe a 3D effect by viewing different images with the right eye and the left eye. That is, the user may acquire information associated with the operation by viewing the 3D image.

The optical element 325 may be a lenticular lens or a parallax barrier. In detail, the parallax barrier may output the plurality of rays 327 in a limited direction through slits or apertures disposed at predetermined intervals. The lenticular lens may output the plurality of rays 327 in the limited direction through a lens curve. The optical element 325 may uniformly output the plurality of rays toward a position of an eye of the user.

FIG. 4 illustrates an operation of the optical element 325 that outputs the plurality of rays 327 in the limited direction. Referring to FIG. 4, the controller 310 may allocate a pixel value corresponding to a first viewpoint to a first pixel 323-1 of the panel 323 and may allocate a pixel value corresponding to a second viewpoint to a second pixel 323-2. A plurality of rays that pass through the panel 323 may be transmitted in a limited direction upon passing the optical element 325. Accordingly, the different rays 327 may be incident to a left eye 341 and a right eye 343 of the user. The different rays 327 incident to the left eye 341 and the right eye 343 may generate two images between which disparity is present. The user may view the 3D image based on the two images between which the disparity is present.

The magnifying optical system 330 may generate the 3D image on a front surface of the windshield by enlarging, that is, magnifying in the plurality of rays 327. For example, the magnifying optical system 330 may adjust a magnification of the 3D image output to the user. That is, the magnifying optical system 330 may enlarge or reduce, that is, zoom in or out the 3D image.

The magnifying optical system 330 may be a catadioptric system. The magnifying optical system 330 may include a mirror corresponding to a reflecting optical system or a lens corresponding to a refracting optical system. For example, the mirror corresponding to the reflecting optical system may be a concave mirror, an aspherical mirror, or a plane mirror. The lens corresponding to the refracting optical system may be a concave lens or a convex lens.

The magnifying optical system 330 may include a folding mirror. The folding mirror may reduce an optical path of the magnifying optical system 330. Accordingly, a space occupied by the magnifying optical system 330 may be reduced and the magnifying optical system 330 may be miniaturized.

Figure 5:
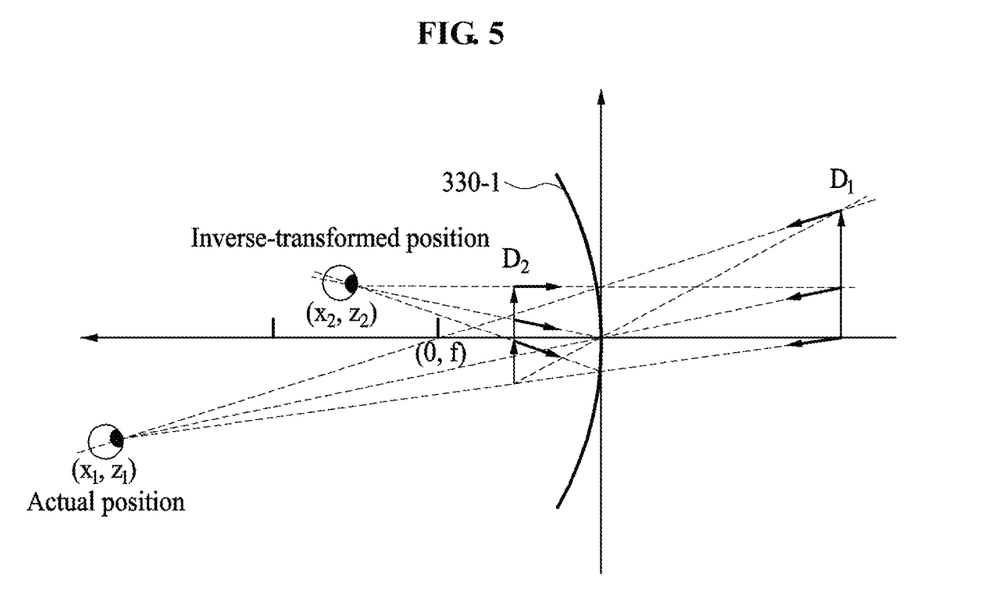
FIG. 5 illustrates an operation of a controller of FIG. 2 according to an exemplary embodiment.

FIG. 5 illustrates an example of an operation of the controller of FIG. 2 according to an exemplary embodiment.

Referring to FIGS. 2 and 5, the controller 310 may allocate pixel values to a plurality of pixels. The controller 310 may determine a path of a ray that passes through each of the plurality of pixels. For example, if a ray that passes through a first pixel is provided to a first viewpoint, the controller 310 may allocate a pixel value corresponding to the first viewpoint to the first pixel.

The controller 310 may allocate a pixel value based on the effect of the magnifying optical system 330 on the plurality of rays. Paths of rays output from the display 320 may be changed by the magnifying optical system 330. For example, the magnifying optical system 330 may change paths of rays to enlarge or reduce, that is, zoom in or out an image.

Accordingly, a precise operation is used for the controller 310 to determine a path of a ray that passes each of a plurality of pixels.

The controller 310 may perform an optical transform or an optical inverse-transform on a tracked position and/or viewpoint of an eye of a user. The controller 310 may perform the optical transform or the optical inverse-transform based on an optical characteristic of a mirror 330-1 including a focus f and a curve. FIG. 5 illustrates a single mirror for clarity of description. However, it is provided as an example only. Various optical systems for generating an optical effect similar to a corresponding mirror may be used instead of using a single mirror.

The controller 310 may determine an actual position $(x_1, z_1)$ of an eye of the user and a virtual image $D_1$ formed on an opposite surface of the mirror 330-1 that constitutes the magnifying optical system 330, and may perform the optical transform or the optical inverse-transform on the actual position $(x_1, z_1)$ and the virtual image $D_1$. Accordingly, the controller 310 may acquire an inverse-transformed position $(x_2, z_2)$ of the eye of the user and a corresponding virtual image $D_2$ that is formed on an inner surface of the mirror 330-1. Here, the corresponding virtual image $D_2$ corresponds to the virtual image $D_1$.

The controller 310 may enhance the accuracy of an operation by performing transform or inverse transform so that the user views the corresponding virtual image $D_2$ at the position $(x_2, z_2)$.

The controller 310 may allocate pixel values to a plurality of pixels based on a positional relationship between the inverse-transformed position $(x_2, z_2)$ of the eye of the user and the corresponding virtual image $D_2$. For example, the controller 310 may determine an optical image corresponding to each of a viewpoint of the right eye and a viewpoint of the left eye of the user and may allocate pixel values to the plurality of pixels based on a positional relationship between each optical image and the display 320. The controller 310 may determine the optical image corresponding to the viewpoint of the user based on the optical transform or the optical inverse-transform.

The controller 310 may allocate a pixel value to a first pixel based on a positional relationship between an optical image corresponding to the first viewpoint and the display 320. Likewise, the controller 310 may allocate a pixel value to a second pixel based on a positional relationship between an optical image corresponding to the second viewpoint and the display 320. Through this, the effect of the magnifying optical system 330 against the plurality of rays may be applied using a relatively small calculation amount.

Figure 6:
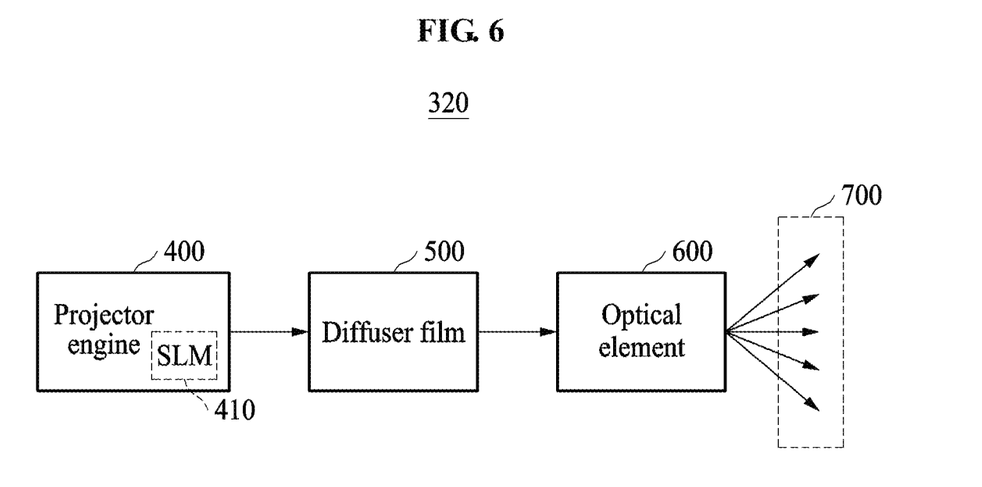
FIG. 6 illustrates another example of the display of FIG. 2 according to an exemplary embodiment.

FIG. 6 illustrates another example of the display of FIG. 2 according to an exemplary embodiment.

Referring to FIG. 6, the display 320 includes a projector engine 400, a diffuser film (or a scattering film) 500, and an optical element 600. The display 320 may output a plurality of rays 700.

Configurations and operations of the optical element 600 and the plurality of rays 700 of FIG. 6 may be substantially the same as the optical element 325 and the plurality of rays 327 of FIG. 3.

The projector engine 400 may include a spatial light modulator (SLM) 410. The projector engine 400 may output, that is emit, a plurality of rays corresponding to an image to be output. The plurality of rays output from the projector engine 400 may pass through at least one of the diffuser film 500 and the optical element 600.

Here, the diffuser film 500 may be provided at a position on an image formation surface of the image output from the projector engine 400. That is, the projector engine 400 may output the image to the diffuser film 500.

The optical element 600 may be a lenticular lens or a parallax barrier. The optical element 600 may uniformly output the plurality of rays 700 toward a position of an eye of the user.

Figure 7A:
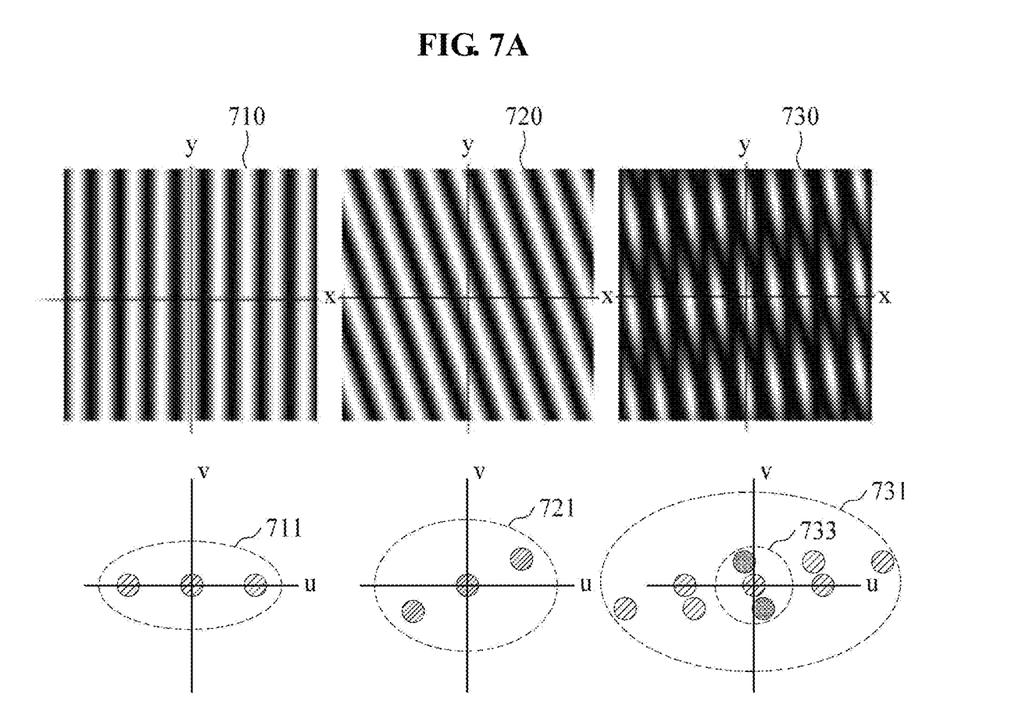
FIG. 7A illustrates an example of describing a moire phenomenon of the display of FIG. 2 according to an exemplary embodiment.
Figure 7B:
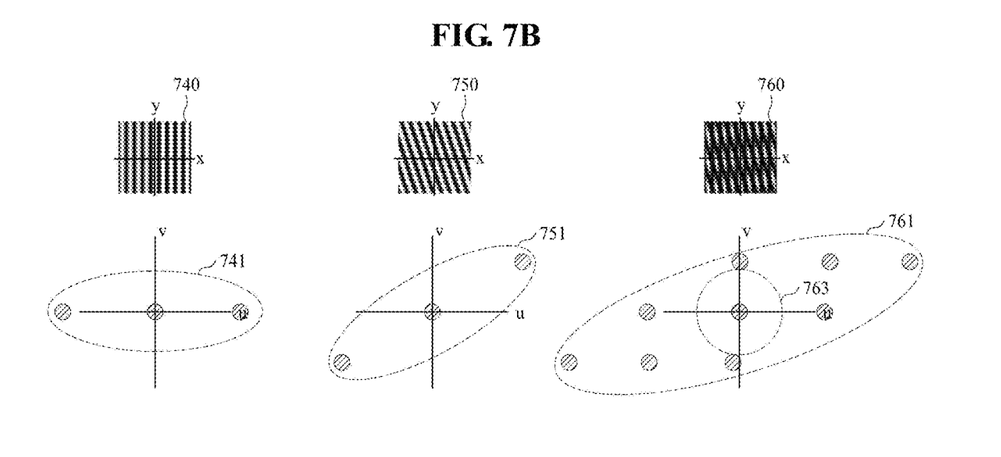
FIG. 7B illustrates another example of describing a moire phenomenon of the display of FIG. 2 according to an exemplary embodiment.
Figure 8:
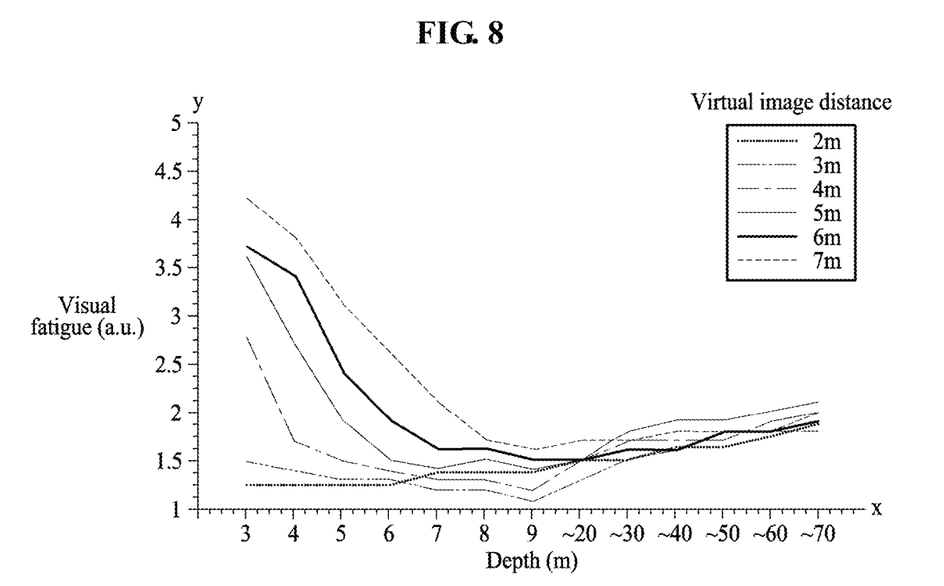
FIG. 8 is an example of a graph showing a visual fatigue of a driver according to an exemplary embodiment.
Figure 9:
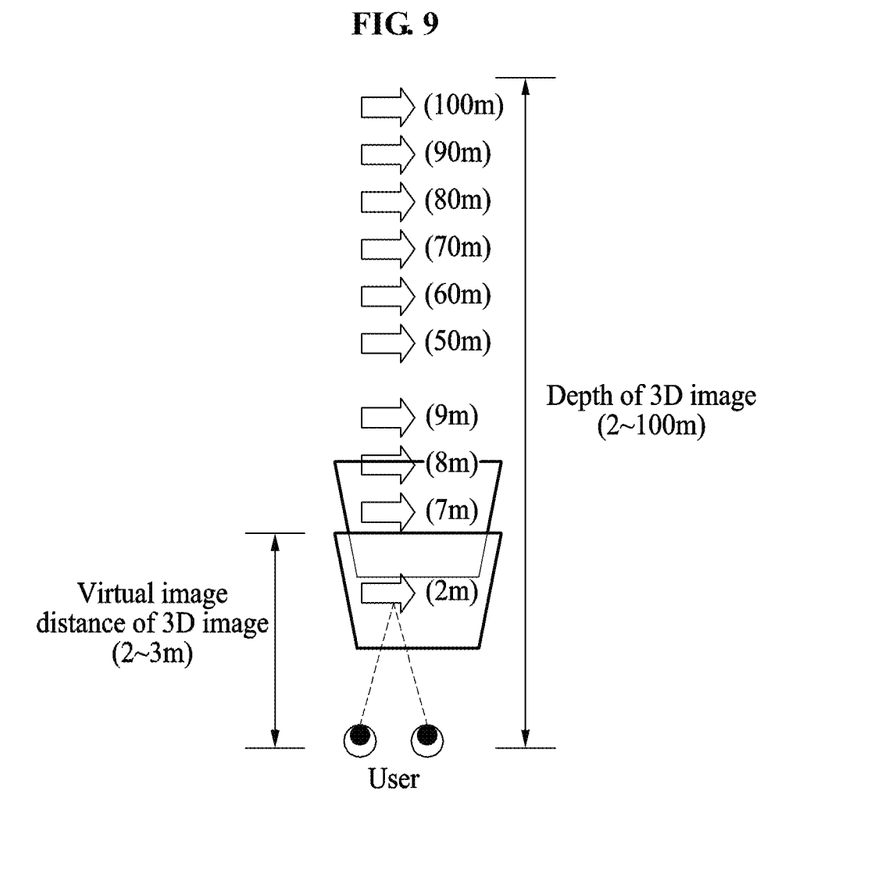
FIG. 9 illustrates an example of an operation of an image processing device based on the visual fatigue of FIG. 8 according to an exemplary embodiment.

FIG. 7A illustrates an example of describing a moire phenomenon of the display of FIG. 2 according to an exemplary embodiment, FIG. 7B illustrates another example of describing a moire phenomenon of the display of FIG. 2 according to an exemplary embodiment, FIG. 8 is an example of a graph showing a visual fatigue of a driver according to an exemplary embodiment, and FIG. 9 illustrates an example of an operation of an image processing device based on the visual fatigue of FIG. 8 according to an exemplary embodiment.

Referring to FIGS. 1 through 9, the plurality of rays 327 or 700 output from the display 320 may be incident onto the magnifying optical system 330. The magnifying optical system 330 may generate an enlarged 3D image on the front surface of the windshield by reflecting or refracting the plurality of rays 327 or 700. When the magnifying optical system 330 generates the 3D image, the magnifying optical system 330 may adjust a virtual image distance of the 3D image by adjusting a magnification of an optical system or by adjusting an interval between mirrors that constitute the magnifying optical system 330.

The magnifying optical system 330 may adjust the virtual image distance of the 3D image based on the moire phenomenon. The moire phenomenon may occur due to an interference between layers having a periodic pattern. That is, the moire phenomenon may occur due to interference between periodic patterns of configurations included in the display 320. For example, a periodic pixel pattern of the panel 323 and a periodic pattern of the optical element 325 may cause the moire phenomenon.

FIG. 7A illustrates an example in which the magnifying optical system 330 outputs the 3D image by increasing a magnification ratio of an optical system.

A moire pattern 730 may be generated based on a linear pattern 710, of the periodic pixel pattern of the panel 323, and a linear pattern 720, of the periodic pattern of the optical element 325.

When the linear pattern 710 by the periodic pixel pattern of the panel 323 is transformed into a frequency domain, it may be represented as a frequency included in a domain 711 indicated by dotted lines. When the linear pattern 720 by the periodic pattern of the optical element 325 is transformed to the frequency domain, it may be represented as a frequency included in a domain 721 indicated by dotted lines.

Here, a frequency included in a domain 731 indicated by dotted lines occurring due to interference or convolution between the frequencies in the domains 711 and 721 may correspond to a moire pattern 730.

FIG. 7B illustrates an example in which the magnifying optical system 330 outputs the 3D image by decreasing a magnification ratio of an optical system.

A moire pattern 760 may be generated based on a linear pattern 740, of the periodic pixel pattern of the panel 323, and a linear pattern 750, of a periodic pattern of the optical element 325.

When the linear pattern 740 of the periodic pixel pattern of the panel 323 is transformed to a frequency domain, it may be represented as a frequency included in a domain 741 indicated by dotted lines. When the linear pattern 750 by the periodic pattern of the optical element 325 is transformed to the frequency domain, it may be represented as a frequency included in a domain 751 indicated by dotted lines.

A frequency included in a domain 761 indicated by dotted lines occurring due to interference or convolution between the frequencies in the domains 741 and 751 may correspond to a moire pattern 760.

The magnifying optical system 330 may adjust a virtual image distance of the 3D image to reduce, or alternatively, minimize the moire phenomenon. That is, to reduce, or alternatively, minimize the moire pattern 730 or 760, the magnifying optical system 330 may adjust the virtual image distance of the 3D image.

According to a decrease in a number of frequencies included in a cognitive frequency domain 733 or 763 indicated by dotted lines, the moire pattern 730 or 760 may become less visible. Accordingly, the magnifying optical system 330 may reduce the virtual image distance of the 3D image by decreasing the magnification ratio of the optical system or by adjusting an interval between mirrors that constitute the magnifying optical system 330 to reduce the number of frequencies included in the cognitive frequency domain 733 or 763.

The graph of FIG. 8 shows the visual fatigue of a user based on a virtual image distance and a depth of a 3D image output from the image processing device 300. In the graph of FIG. 8, an x axis denotes the depth of the 3D image and a y axis denotes the visual fatigue of the user. Each line of a different pattern represents a virtual image distance of the 3D image. Referring to the graph of FIG. 8, the visual fatigue of the user was measured to be a value from 1 point to 5 points, while changing the depth of the 3D image within the range of 3 to 70 meters (m) at each virtual image distance. Also, the visual fatigue of the user was measured while changing each virtual image distance within the range of 2 to 7 m based on a unit of 1 m. The visual fatigue of the user may represent a relative value.

When the virtual image distance of the 3D image output from the image processing device 300 is one of 2 m and 3 m and the image processing device 300 represents a near distance corresponding to a relatively shallow depth, the graph shows that a fatigue level of the user does not increase. When the virtual image distance of the 3D image output from the image processing device 300 is any one of 4 m, 5 m, 6 m, and 7 m, and the image processing device 300 represents the near distance corresponding to the relatively shallow depth, the graph shows that the fatigue level of the user may increase. That is, when the image processing device 300 represents the 3D image as the near distance corresponding to the relatively shallow depth as compared to the virtual image distance, the fatigue level of the user may increase.

When the virtual image distance of the 3D image output from the image processing device 300 is one of 2 m and 3 m and the image processing device 300 represents a far distance, corresponding to a relatively large depth, the graph shows that the fatigue level of the user does not change significantly. When the virtual image distance of the 3D image output from the image processing device 300 is any one of 4 m, 5 m, 6 m, and 7 m and the image processing device 300 represents the far distance, corresponding to a relatively large depth, the graph shows that the fatigue level of the user does not change greatly. That is, when the image processing device 300 represents the 3D image as the far distance corresponding to the relatively large depth, the virtual image distance of the 3D image may not greatly affect the visual fatigue.

Accordingly, the image processing device 300 may output the 3D image while not increasing the fatigue level of the user. For example, the image processing device 300 may output the 3D image to have a depth greater than the virtual image distance.

When the virtual image distance of the 3D image is one of 2 m and 3 m, the image processing device 300 may represent the depth of the 3D image as the near distance or the far distance. That is, the image processing device 300 may represent the near distance or the far distance by adjusting the depth of the 3D image within the range of 2 to 100 m. When the virtual image distance of the 3D image is one of 2 m and 3 m, the image processing device 300 may generate the 3D image in front of the hood of the vehicle.

When the virtual image distance of the 3D image is any one of 4 m, 5 m, 6 m, and 7 m, the image processing device 300 may represent the depth of the 3D image as the far distance. Here, the image processing device 300 may adjust the depth of the 3D image to be greater than the virtual image distance.

FIG. 9 illustrates an example in which the image processing device 300 outputs a 3D image for a user by adjusting a virtual image distance and/or a depth of the 3D image.

Figure 10:
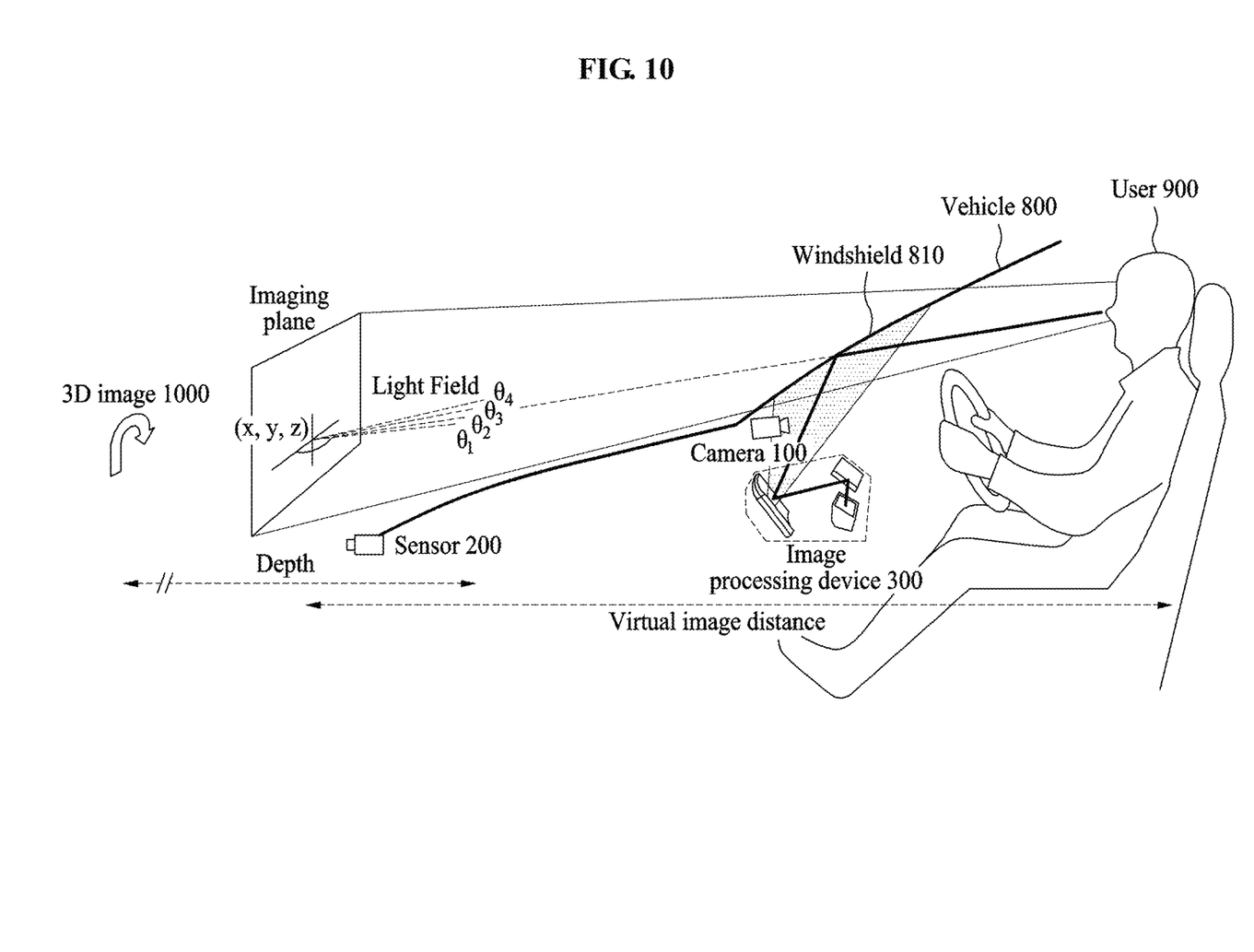
FIG. 10 illustrates an example of the image processing system of FIG. 1 configured in a vehicle according to an exemplary embodiment.

FIG. 10 illustrates an example in which the image processing system of FIG. 1 is configured in a vehicle according to an exemplary embodiment.

Referring to FIG. 10, the components that constitute the image processing system 10 may be configured in a vehicle 800.

The image processing device 300 may acquire information about a tracked position and/or viewpoint of an eye of a user 900, that is, a driver, from the camera 100 and may acquire information about a front of the vehicle 800 from the sensor 200. The image processing device 300 may acquire information from the camera 100 and/or the sensor 200 in real time. Accordingly, although the position of the eye of the user 900 or the viewpoint of the user 900 is changed, the user may view an image representing a sense of reality similar to an actual environment.

The image processing device 300 may generate an image based on one of or any combination of information about the position of the eye of the user 900, information about the viewpoint of the user 900, and information about what is in front of the vehicle 800. For example, the image processing device 300 may output an optical image or a virtual image in front of the user 900 through a windshield 810.

The image processing device 300 may output a 3D image 1000. For example, the image processing device 300 may output the 3D image 1000 by performing a light field rendering operation. The image processing device 300 may minimize a visual fatigue of the user by adjusting one of or a combination of a virtual image distance and a depth of the 3D image 1000.

In addition to the vehicle 800, the image processing system 10 may be configured in a motor cycle, a smart mobility vehicle, a boat or ship, an airplane, or the like.

Figure 11:
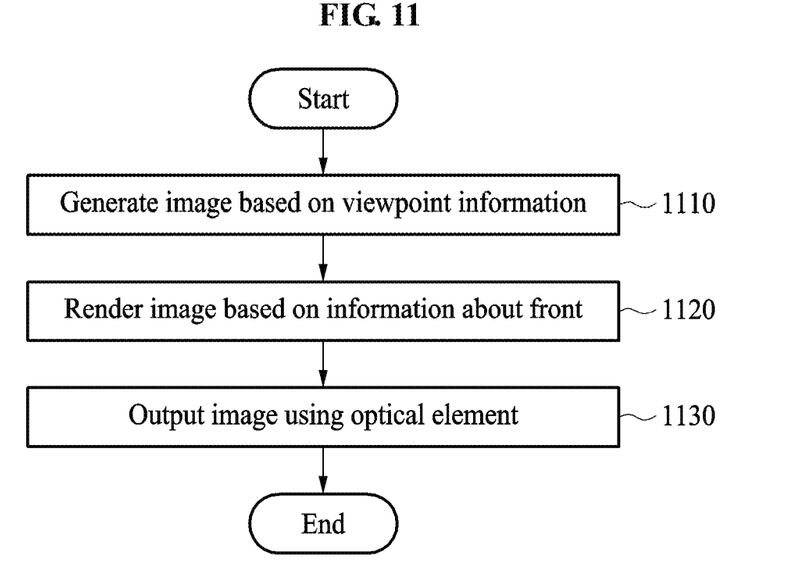
FIG. 11 is a flowchart illustrating an image processing method according to an exemplary embodiment.

FIG. 11 is a flowchart illustrating an image processing method according to an exemplary embodiment.

Referring to FIGS. 1 and 11, in operation 1110, the image processing device 300 may generate an image based on viewpoint information of a user. The image processing device 300 may acquire viewpoint information of the user from the camera 100. Herein, the user may be a driver that drives a transportation device. The viewpoint information may include a position of an eye and/or a viewpoint of the user.

The image processing device 300 may acquire viewpoint information of the user in real time. Accordingly, although the position of the eye of the user or the viewpoint of the user varies, the user may continue to view an image representing a sense of reality similar to an actual environment.

In operation 1120, the image processing device 300 may render the image based on information about what is in front of the vehicle. The image processing device 300 may acquire information about what is in front of the vehicle from the sensor 200. Information about what is in front of the vehicle may include information about vehicle surroundings ahead of the vehicle, information about an object ahead of the vehicle, and the like. Information about the surroundings may include, for example, road information, lane information, speed bump information, traffic light information, and speed camera information. Information about the object may include, for example, shape information, position information, and depth information of the object.

The image processing device 300 may generate an AR object of an image to be output based on information about what is in front of the vehicle. The AR object may indicate AR content. The image processing device 300 may adjust a depth of the AR object included in the image to be output. The image processing device 300 may render the AR object based on navigation, map information, a GIS, and the like.

In operation 1130, the image processing device 300 may output the image using an optical element. The optical element may be a lenticular lens or a parallax barrier. That is, the image processing device 300 may uniformly output a plurality of rays having a limited direction to the user. The user may thereby view a 3D image.

The methods according to the above-described exemplary embodiments may be recorded in non-transitory computer-readable media including program instructions to implement various operations of the above-described exemplary embodiments. The media may also include, alone or in combination with the program instructions, data files, data structures, and the like. The program instructions recorded on the media may be those specially designed and constructed for the purposes of exemplary embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described exemplary embodiments, or vice versa.

The foregoing exemplary embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An image processing method comprising:
   tracking first information including a first position of a left eye of a user and a second position of a right eye of the user;
   generating second information associated with at least one of surroundings and an object present in front of the user;
   rendering an image of a display panel so as to provide a first virtual image to be input to the left eye of the user and a second virtual image to be input to the right eye of the user on an imaging plane based on the first information and the second information; and
   controlling the display panel to output the rendered image,
   wherein a depth range of a 3-Dimensional (3D) Augmented Reality (AR) object is determined based on the depth of the imaging plane, wherein a depth of the 3D AR object, within the depth range, represented by the first and second virtual images is different from a depth of the imaging plane, and wherein the first information is acquired by directly detecting the right eye or the left eye of the user using at least one of an image camera and an infrared camera or acquired by detecting the right eye or the left eye of the user as reflected on a windshield of a vehicle.

2. The image processing method of claim 1, wherein the second information comprises at least one of a shape, a position, and a depth of the object present in front of the user acquired by using a sensor.

3. The image processing method of claim 1, wherein the rendering of the rendered image comprises:

generating the 3D AR object based on the second information; and determining pixel values of the image of the display panel based on the 3D AR object and the first information.

4. The image processing method of claim 3, wherein the determining of the pixel values comprises:

allocating a first image to be input to the left eye of the user to a plurality of sub-pixels of the display panel corresponding to the first position of the left eye of the user; and allocating a second image to be input to the right eye of the user to a plurality of sub-pixels of the display panel corresponding to the second of the right eye of the user.

5. The image processing method of claim 1, further comprising:

outputting the rendered image using an optical element.

6. The image processing method of claim 5, wherein the optical element is at least one of a lenticular lens and a parallax barrier.

7. The image processing method of claim 5, wherein the outputting the rendered image comprises enlarging the rendered image using a magnifying optical system.

8. The image processing method of claim 1, wherein based on a determination that the depth of the imaging plane is between a first distance and a second distance, the depth of the 3D AR object is represented as a near distance image or as a far distance image, wherein based on a determination that the depth of the imaging plane is between a third distance and a fourth distance, the depth of the 3D AR object is represented as the far distance image, and wherein the third and the fourth distance is farther from the right and left eyes of the user than the first distance and the second distance.

9. The image processing method of claim 1, wherein based on a determination that the depth of the imaging plane is between 2 and 3 meters, the depth of the 3D AR object is set to be between 2 to 100 meters, and wherein based on a determination that the depth of the imaging plane is between 3 to 7 meters, the depth of the 3D AR object is set to be greater than the depth of the imaging plane.

10. An image processing device comprising:

a display panel comprising a plurality of pixels;

a controller configured to track first information including a first position of a left eye of a user and a second position of a right eye of the user, generate second information associated with at least one of surroundings and an object present in front of the user, render an image of the display panel so as to provide a first virtual image to be input to a left eye of the user and a second virtual image to be input to a right eye of the user on an imaging plane based on the first information and the second information, and control the display panel to output the rendered image, wherein a depth range of a 3-Dimensional (3D) Augmented Reality (AR) object is determined based on the depth of the imaging plane, wherein a depth of the 3D AR object, within the depth range, represented by the first and second virtual images is different from a depth of the imaging plane;

a magnifying optical system configured to enlarge the rendered image; and at least one of an image camera and an infrared camera configured to acquire the first information based on one of a direct detection of the right eye or the left eye of the user directly and a detection of the right eye or the left eye of the user as reflected on a windshield of a vehicle.

11. The image processing device of claim 10, further comprising a sensor configured to acquire at least one of a shape, a position, and a depth of the object present in front of the user.

12. The image processing device of claim 10, wherein the controller is further configured to allocate first image to be input to the left eye of the user to a plurality of sub-pixels of the display panel corresponding to the first position of the left eye of the user, and to allocate a second image to be input to the right eye of the user to a plurality of sub-pixels of the display panel corresponding to the second position of the right eye of the user.

13. The image processing device of claim 10, wherein the controller is further configured to render the rendered image based on an optical transformation of the first information.

14. The image processing device of claim 10, further comprising:

at least one of a lenticular lens and a parallax barrier.

15. The image processing device of claim 10, wherein the magnifying optical system comprises at least one of an aspherical mirror and a plane mirror.

* * * * *